Dec. 9, 1924.
C. O. SATHER
1,518,222
CLOSURE EXTRACTING AND REPLACING DEVICE FOR RECEPTACLES
Filed Feb. 13, 1923
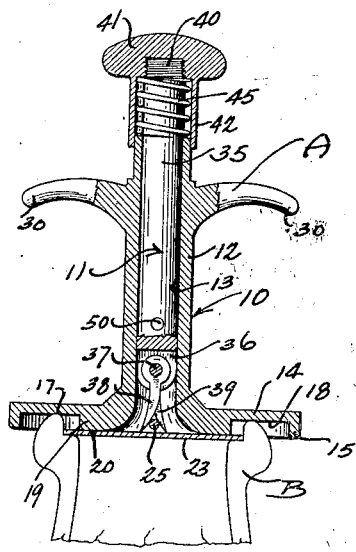
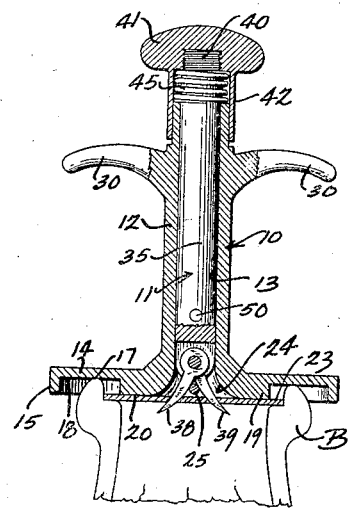
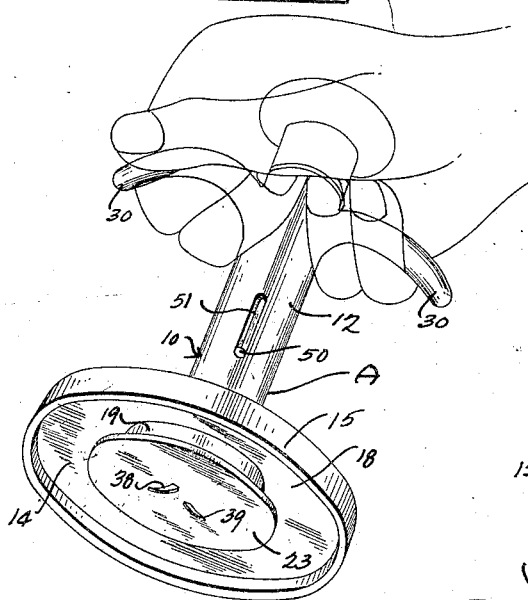
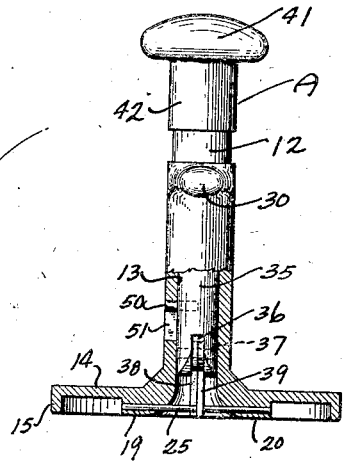
Inventor
Carl O. Sather,
By Lancaster & Allwine
Attorneys Patented Dec. 9, 1924.

1,518,222

UNITED STATES PATENT OFFICE.

CARL O. SATHER, OF MINNEAPOLIS, MINNESOTA, ASSIGNOR TO EMIL KLEPPEN, OF MINNEAPOLIS, MINNESOTA.

CLOSURE EXTRACTING AND REPLACING DEVICE FOR RECEPTACLES.

Application filed February 13, 1923. Serial No. 618,826.

*To all whom it may concern:*

Be it known that I, CARL O. SATHER, a citizen of the United States, residing at Minneapolis, in the county of Hennepin and State of Minnesota, have invented certain new and useful Improvements in Closure Extracting and Replacing Devices for Receptacles, of which the following is a specification.

This invention relates to a closure extracting and replacing device for receptacles.

The primary object of this invention is the provision of a relatively simple and compact device which will permit the facile extraction or replacement of the caps of milk bottles and the like.

A further object of this invention is the provision of a cap extractor primarily adapted for use in connection with milk and cream receptacles which may be quickly and conveniently used to extract or replace the cap of a receptacle without liability of spilling the contents of the receptacle.

A further object of this invention is the provision of milk bottle cap extracting means which is manually operable and may be accurately used by quick operation to extract or replace the cap of a bottle.

A further object of this invention is the provision of a tool of the above described character, which will permit of cap extraction without liability of unnecessary mutilation of the cap.

Other objects and advantages of this invention will be apparent during the course of the following detailed description.

In the accompanying drawing, forming a part of this specification, and wherein similar reference characters designate corresponding parts throughout the several views, Figure 1 is a cross sectional view, taken through the improved device, showing the same in position upon a milk bottle preliminary to a cap extracting operation.

Figure 2 is a cross sectional view, altogether similar to the view illustrated in Figure 1, however, illustrating the improved device after the same has been operated to permit of cap extraction from the bottle.

Figure 3 is a side elevation, partly in section, showing the improved details of this invention.

Figure 4 is a perspective view of the improved milk bottle cap extractor, showing the same manually operated to support the cap of a milk bottle.

In the drawing, wherein for the purpose of illustration is shown but the preferred embodiment of this invention, the letter A generally designates the improved cap extracting and replacing tool which may include the housing or body portion 10; and means 11 movably supported thereby to facilitate cap extraction and replacement.

Referring to the housing 10, the same is preferably of aluminum or analogous material, including the upstanding tubular portion 12, providing a passageway 13 longitudinally therethrough, and the lower bottle engaging disc or flange 14, which extends annularly about the lower end of the tube portion 12, and is provided with a depending flange 15 annularly extending about the outer edge of the disc 14. In position upon a milk bottle, the upper edge 17 of the latter is adapted for engaging the lower surface 18 of the disc 14. An annular portion 19 depends below the lower surface 18 of the bottle engaging disc 14, which is adapted for placement within the opening of the bottle B, and includes a lower relatively flat surface 20 adapted for resting upon the top surface of the milk bottle cap 23, substantially as is illustrated in Figures 1 and 2 of the drawing, during the cap removing or replacing operation. It is preferred that the passageway 13 of the body 10 at the point of exit from the annular cap engaging shoulder 19 be outwardly flared, as at 24 and arcuated to permit operation of the cap engaging details of this invention. A pin 25 is preferably supported by the depending annular portion 19 of the housing 10, extending diametrically across the passageway 13 at this point of the body 10, for a purpose which will be subsequently described. Adjacent its top end, and remote from the bottle engaging disc 14, the body portion 10 is preferably provided with laterally extending finger projections 30.

Referring to the means 11, the same includes a plunger or bolt element 35, which is preferably cylindrical in formation and bifurcated at its lower end to provide an inwardly extending recess 36, across which a pintle or pin 37 extends for pivotally receiving a pair of cap engaging prongs 38 and 39. The cap engaging prongs 38 and 39, at their lower ends, are preferably slightly arcuated away from each other, and when disposed within the passageway 13 of the body 10 engage the pin 25 on opposite sides thereof, substantially as is illustrated in Figures 1, 2, and 4 of the drawing. The upper end of the bolt or plunger 35 is preferably reduced, and screw threaded, as at 40, for detachably receiving a hand engaging cap 41. An annular sleeve or guide portion 42 depends from the cap head 41, and slidably engages the exterior of the body tube portion 12 upwardly of the finger engaging extensions 30. A spiral spring 45 is preferably provided intermediate the top edge of the body 12 and the cap 41, and disposed within the guide sleeve 42, and which normally urges the plunger 35 upwardly within the body passageway 13, so that the cap engaging prongs or members 38 and 39 are normally retracted within the passageway 13 just upwardly of the outer surface 20 of the cap engaging annular shoulder 19. This position of the details of this invention is illustrated in Figure 1 of the drawing, and it can be seen that when the device A is placed upon the bottle B for cap extraction, the points of the prongs 38 and 39 will not engage the cap 23 of the bottle B until the plunger is manually depressed. In order to prevent rotation of the plunger within its casing, the same is preferably provided with a laterally extending pin or projection 50 slidably disposed within the slot 51 of the body tube 12, so that the plunger may move in a straight reciprocatory path within the passageway 13.

To extract the cap 23 of a milk bottle B, the device A is placed upon the bottle B as hereinbefore described, and in which position the flat surface 20 of the annular shoulder 19 preferably engages the cap at its upper surface, while the disc portion or flange 14 rests upon the top edge 17 of the bottle B. When the operator presses upon the top 41, the plunger or bolt 35 is moved downwardly within the passageway 13. Due to the fact that the cap prongs 38 and 39 engage on opposite sides of the pin 25, they will be separated upon movement toward the cap 23, so that the same will gradually expand with respect to each other and likewise extend below the lower surface 20 of the body shoulder 19 for entrance into the cap 23. This insertion of the prongs 38 and 39 in the cap 23 is effected without undue mutilation of the cap, and it is obvious that the lower ends of the prongs which extend within the bottle past the cap provide shoulders which will permit the easy withdrawal of the cap 43 when the device A is moved away from the bottle B.

The replacement of the cap 23 from the position on the device A is effected in facile manner, as it is merely necessary to again replace the device A upon the bottle B, and in which case the shoulder 19 will maintain the cap 23 in proper relation to the neck of the bottle B, so that the operator may release manual depression of the spring 45, and in which case the prongs 38 and 39 will be withdrawn from the cap and the cap properly positioned to close the bottle B.

From the foregoing description of this invention it is obvious that a device for the extraction and replacement of closures upon receptacles has been provided, which will permit the cap to be quickly and conveniently removed without liability of spilling the contents of the receptacle, or without mutilation of the closure member as to render the same useless.

Various changes in the shape, size and arrangement of parts may be made to the form of the invention herein shown and described, without departing from the spirit of this invention or the scope of the claims.

I claim:

1. A device for extracting and replacing a closure disc of a receptacle, said device comprising a body open at its lower end and having its lower end portion provided with a portion adapted to rest upon the upper edge of the receptacle during a closure extracting or replacing operation and a portion for extending into the receptacle and engaging the upper face of the closure disc, a plunger slidable in said body, relatively expansible prongs pivotally carried by the lower end portion of said plunger and movable out of the lower end of the body and through a closure disc when the plunger is moved downwardly and means mounted in said body between said prongs for causing spreading of the prongs when the prongs and plunger are moved downwardly and the prongs moved through the open lower end of the body and through a closure disc.

2. A milk bottle cap extracting device comprising a body, a bolt slidable in the body, cap engaging prongs pivoted on said bolt and extending below the same, and a pin extending transversely through the body and adapted to receive said prongs thereagainst on opposite sides, said bolt upon downward movement in the body adapted to extend said prongs through the lower end of the body with the prongs engaging said pin and moved thereby in opposite directions for closure engagement.

3. A cap extracting tool for milk bottles comprising an open ended tubular body portion having a bottle engaging disc at its open lower end and finger engaging projections adjacent its upper end, an annular shoulder provided about the lower end of said body portion beneath said disc for engaging the upper face of a closure disc for the bottle, a plunger reciprocably disposed in said body portion and having its lower end portion bifurcated, a pair of prongs pivotally mounted in the bifurcated end of said plunger adjacent the lower end of said body, a detachable cap member carried by the upper end of said plunger and positioned exteriorly of said body portion and provided with a sleeve adapted for sliding over the upper end portion of said body, a spring about said plunger engaging the upper end of the body and the cap for normally maintaining said plunger in a raised position with prongs collapsed within the body, and a prong spreading pin extending transversely through the body between the prongs.

CARL O. SATHER.